United States Patent
Chintala

(10) Patent No.: US 9,895,996 B2
(45) Date of Patent: Feb. 20, 2018

(54) BATTERY MANAGEMENT APPARATUS AND METHOD

(71) Applicant: Sandeep Kumar Chintala, Sutton (GB)

(72) Inventor: Sandeep Kumar Chintala, Sutton (GB)

( * ) Notice: Subject to any disclaimer, the term of this patent is extended or adjusted under 35 U.S.C. 154(b) by 631 days.

(21) Appl. No.: 14/371,761

(22) PCT Filed: Jan. 11, 2013

(86) PCT No.: PCT/GB2013/050045
§ 371 (c)(1),
(2) Date: Jul. 11, 2014

(87) PCT Pub. No.: WO2013/104910
PCT Pub. Date: Jul. 18, 2013

(65) Prior Publication Data
US 2015/0048673 A1    Feb. 19, 2015

(30) Foreign Application Priority Data
Jan. 13, 2012  (GB) .................................. 1200499.0

(51) Int. Cl.
*B60L 1/00*    (2006.01)
*B60L 3/00*    (2006.01)
(Continued)

(52) U.S. Cl.
CPC ............. *B60L 11/1866* (2013.01); *B60L 1/00* (2013.01); *B60L 1/02* (2013.01); *B60L 1/14* (2013.01);
(Continued)

(58) Field of Classification Search
CPC ....... H02J 7/04; H02J 7/00; H02J 7/02; B60L 11/18; G06F 1/26; G08B 23/00; G08B 1/08; B60W 20/00; B60W 20/10
(Continued)

(56) References Cited

U.S. PATENT DOCUMENTS 6,014,597 A  *  1/2000  Kochanneck ............ B60K 1/04
                                                              320/109
6,459,175 B1 * 10/2002  Potega ................... B60L 11/185
                                                              307/132 M
(Continued)

FOREIGN PATENT DOCUMENTS

DE          19617548 A    11/1997

*Primary Examiner* — Rexford Barnie
*Assistant Examiner* — Jagdeep Dhillon
(74) *Attorney, Agent, or Firm* — Thompson Hine LLP

(57) ABSTRACT

A battery management apparatus and method for use in an electrical vehicle has a plurality of individual batteries 34 provided within a battery pack 10. The battery pack is coupled to power vehicle traction 12 and a plurality of individually connectable vehicle appliances 18-26. A monitor keeps track of charge state by means of a battery monitor 44 on each battery relaying instant current to a processor 27. In a first embodiment, a charge allocation profile for the whole battery pack 10 is used where different appliances 18-26 have different amounts of charge capacity allocated to them and are disconnected when discharge exceeds their allocation and are reconnected during charging when their charge is again found. In a second embodiment, individual batteries 34 and appliances 18-26 are connected within a network configuration allowing anything to be connected to anything else. Battery 10 segments can be created, each having one or more allocated individual batteries and each segment connected to selectable services 12 18-26 within the electric vehicle. Segmentation patterns can be changed. A segment charge allocation profile can be used within each segment in much the same way that the charge allocation
(Continued)

profile can be used and changed for the first embodiment. Progressive charging and discharging of the battery is the end result.

61 Claims, 6 Drawing Sheets

(51) Int. Cl.
| | |
|---|---|
| *H02G 3/00* | (2006.01) |
| *B60L 11/18* | (2006.01) |
| *H02J 7/04* | (2006.01) |
| *H02J 7/00* | (2006.01) |
| *B60L 1/02* | (2006.01) |
| *B60L 1/14* | (2006.01) |
| *B60R 16/033* | (2006.01) |

(52) U.S. Cl.
CPC ....... *B60L 11/1809* (2013.01); *B60L 11/1855* (2013.01); *B60L 11/1859* (2013.01); *B60L 11/1862* (2013.01); *B60R 16/033* (2013.01); *H02J 7/007* (2013.01); *H02J 7/0021* (2013.01); *H02J 7/0022* (2013.01); *H02J 7/0026* (2013.01); *H02J 7/0063* (2013.01); *H02J 7/04* (2013.01); *B60L 2240/545* (2013.01); *B60L 2240/547* (2013.01); *B60L 2240/549* (2013.01); *B60L 2250/12* (2013.01); *B60L 2250/16* (2013.01); *H02J 2007/0067* (2013.01); *Y02T 10/7005* (2013.01); *Y02T 10/7044* (2013.01); *Y02T 10/7055* (2013.01); *Y02T 10/7061* (2013.01)

(58) Field of Classification Search
USPC ....... 307/9.1, 10.1, 10.2; 320/152, 150, 109; 701/22; 700/297; 713/300, 340, 1, 2; 726/35, 36
See application file for complete search history.

(56) References Cited

U.S. PATENT DOCUMENTS

| | | | | |
|---|---|---|---|---|
| 6,462,511 | B1* | 10/2002 | Kwok ................... | H02J 7/0024 320/119 |
| 8,667,610 | B2* | 3/2014 | Chen .................... | H02J 7/0004 709/203 |
| 2009/0212626 | A1* | 8/2009 | Snyder .................... | B60K 6/28 307/10.1 |
| 2010/0072954 | A1* | 3/2010 | Kohn .................... | H02J 7/0091 320/152 |
| 2010/0141206 | A1* | 6/2010 | Agassi .................... | B60K 1/04 320/109 |
| 2010/0230188 | A1* | 9/2010 | Nguyen ............... | B60L 11/1822 180/65.1 |
| 2010/0244782 | A1 | 9/2010 | Nagayama et al. | |
| 2010/0261048 | A1* | 10/2010 | Kim ....................... | H01M 10/44 429/150 |
| 2010/0271199 | A1* | 10/2010 | Belov ..................... | G01M 5/00 340/539.3 |
| 2011/0144823 | A1* | 6/2011 | Muller ..................... | B60L 3/04 700/297 |
| 2012/0035795 | A1* | 2/2012 | Yu ..................... | B60W 50/0097 701/22 |
| 2012/0139491 | A1* | 6/2012 | Eberhard .............. | H02J 7/0016 320/118 |
| 2012/0145782 | A1* | 6/2012 | Ma ........................ | G07F 19/207 235/379 |
| 2012/0210150 | A1* | 8/2012 | de Lind van Wijngaarden ........ | G06F 1/3212 713/320 |
| 2012/0254633 | A1* | 10/2012 | Vilhauer ............... | G06F 1/3212 713/300 |

\* cited by examiner

BATTERY MANAGEMENT APPARATUS AND METHOD

The present invention relates to and apparatus and method for managing charging and discharging a battery. The invention most particularly relates, but is not restricted to, management of battery charge and discharge in an electric vehicle.

The advent of an aspired-to low carbon emission economy has spawned many different so-called "green" power provision systems, generally domestic, using, for example, solar cells, windmills and heat pumps to generate local power. Nearly all of such domestic systems include a storage battery for providing power during those periods when domestically created stored green power is supplied to a plurality of devices. The present invention is applicable to such domestic power generation systems.

The low carbon emission economy has also spawned a "low toxic emission" economy where motor vehicles are evolved to provide lower emission of "greenhouse" gasses and lower emission of medically harmful substances than current internal combustion engine powered vehicles. Such green vehicles include, but are not limited to: angular kinetic energy flywheel powered vehicles; hydrogen combustion engine powered vehicles; vehicles providing fuel cell electrical generation to power an electric traction motor; hybrid vehicles that employ a combination of technologies, usually a combustion engine of any kind, or fuel cell in combination with battery to power an electric traction motor; and purely electric vehicles where a charged battery, rechargeable at charging stations, can power an electric traction motor. The present invention can be applied to any of the so-called green vehicles that use a storage battery for use in powering an electric motor to provide traction.

International Patent Application WO2011131946 (A1) discloses a battery management system for an electric vehicle. The vehicle includes (a) a traction battery comprising multiple individual cells and (b) a secondary battery providing power for non-traction electric systems in the vehicle. The battery management system enables the secondary battery to be used to provide charge to individual cells in the traction battery. Non-traction electric systems include one or more of: electric heater, brake lights during regeneration, reverse lights, reverse warning horn, 12 v vehicle charging unit, power steering pump output. The present invention seeks to provide improvement there over by allowing some or all secondary non traction electric systems to be maintained during battery discharge.

International Patent Application WO2011092363 (A2) discloses a system and a method for managing a set of batteries for an electric vehicle which comprises battery reading cards which comprise an A/D converter which converts the battery voltages from analogue to digital, a plurality of power resistances that dissipate excess energy during balancing operations, and a micro-controller which controls the operation thereof; a coordinator for battery control cards which is connected to the micro-controller of each battery control card and to a sensor for detecting the current which passes through the batteries; and a bus which has electrical isolation and interconnects the batteries the controller and the current sensor. The present invention seeks to provide improvement there over by providing an apparatus and method including a controller where batteries need be balanced.

United States Patent Application US2010182154 (A1) discloses a battery management system which can manage a power unit of an electric vehicle. The power unit includes a plurality of battery modules. The battery management system includes: a power source for a motor, the power source being constituted by a plurality of battery modules having battery cells; battery module status sensors mounted on the battery modules on the one to one basis, detecting voltages and temperatures of the battery modules; and a control unit judging statuses of the battery modules on the basis of data detected by the battery module status sensors. The battery module status sensors are mutually connected in series by a communication line for transmitting numbering data, and each battery module status sensor assigning itself with an ID code on the basis of ID information received from an upstream battery module status sensor, and transmitting the ID information as well as the ID code to a downstream battery module status sensor. The control unit is connected to the battery module status sensors via the communication line for transmitting the numbering data and a communication line for transmitting various data except for the numbering data, and locates an abnormal battery module on the basis of detection information received via the communication line for transmitting the numbering data and the communication line for transmitting various data except for the numbering data. The present invention seeks to provide improvement there over by utilizing such information the better to provided sustained traction to an electric vehicle.

According to a first aspect, the present invention provides an apparatus operable to control charge and discharge of a storage battery, the apparatus comprising: a battery pack; means selectably operable to connect the battery pack to one or more of a plurality of power consuming items according to a charge allocation profile; means operable to monitor the state of charge of the battery pack; means operable to compare the state of charge of the battery pack with the charge allocation profile; means operable to determine when the difference between the monitored state of charge and the profile passes a threshold amount; and means operable to adjust the state of connection of at least one of the plurality of power consuming items in response to the threshold being passed.

According to a second aspect, the present invention provides an apparatus for controlling charge and discharge of a battery pack where; the battery pack comprises a plurality of individual batteries, and wherein the apparatus comprises; means operable to select one or more individual batteries to supply power in an individual segment; where the apparatus comprises means operable to establish one or more segments; and no individual battery is selected to provide power in more than one segment According to a third aspect, the present invention provides a method for controlling charge and discharge of a storage battery, method comprising: a step of selectably connecting a battery pack to one or more of a plurality of power consuming items according to a charge allocation profile; a step of monitoring the state of charge of the battery pack; a step of comparing the state of charge of the battery pack with the charge allocation profile; a step of determining when the difference between the monitored state of charge and the charge allocation profile passes a threshold amount and a step of adjusting the state of connection of at least one of the plurality of power consuming items in response to the threshold being passed.

According to a fourth aspect, the present invention provides a method for controlling charge and discharge of a battery pack where the battery pack comprises a plurality of individual batteries, the method comprising: a step of selecting one or more individual batteries to supply power in an individual segment; a step of establishing one or more segments; and a step of selecting no individual battery provide power in more than one segment.

The invention also provides means to select a new charge allocation profile in response to the threshold being passed, and can include means to receive the new charge allocation profile from a user; and means automatically to receive the new charge allocation profile from a controlling processor.

The invention can also provide means operable by the user to change the allocation profile at any time.

The invention can also provide that, during battery pack discharging, a power consuming item can be disconnected when its charge allocation profile entry falls to zero; and that, during battery pack charging, a power consuming item can be reconnected whenever the battery pack charge allocated to that power consuming item rises above zero.

The invention is also provided for use in an electrical vehicle.

The invention also provides that the battery pack can comprise a plurality of individual batteries, and that the apparatus can comprise; means operable to select one or more individual batteries to supply power in an individual segment; where the apparatus can comprise means operable to establish one or more segments; and no individual battery is selected to provide power in more than one segment.

The invention also provides an apparatus operable to connect the or each segment to supply power to a selectable range of one or more power consuming items.

The invention also provides that individual batteries can be reassigned within the one or more segments.

The invention also provides an apparatus that can comprise means operable to control charge and discharge of the charge within a segment, the apparatus comprising: means selectably operable to connect the segment to one or more of a plurality of power consuming items according to a predetermined charge allocation profile; means operable to monitor the state of charge of the segment; means operable to compare the state of charge of the segment with the predetermined segment charge allocation profile; means operable to determine when the predetermined segment charge allocation profile has passed a segment threshold and means operable to adjust the state of connection of at least one of the plurality of power consuming items in response to the segment threshold being passed.

The invention also provides means to select a new segment charge allocation profile in response to the threshold being passed.

The invention also provides an apparatus comprising at least one of: means to receive the new charge segment allocation profile from a user; and means automatically to receive the new segment charge allocation profile from a controlling processor.

The invention also provides that the user can change the segment allocation profile at any time.

The invention also provides that, during segment discharging, a power consuming item can disconnected when its segment charge allocation profile entry falls to zero; and, during segment charging, that a power consuming item can be reconnected whenever the segment charge allocated to that power consuming item rises above zero.

The invention also provides for progressive charging an discharging of a battery pack.

The invention is further explained by the following description to be read in conjunction with the appended drawings, in which.

Figure 1:
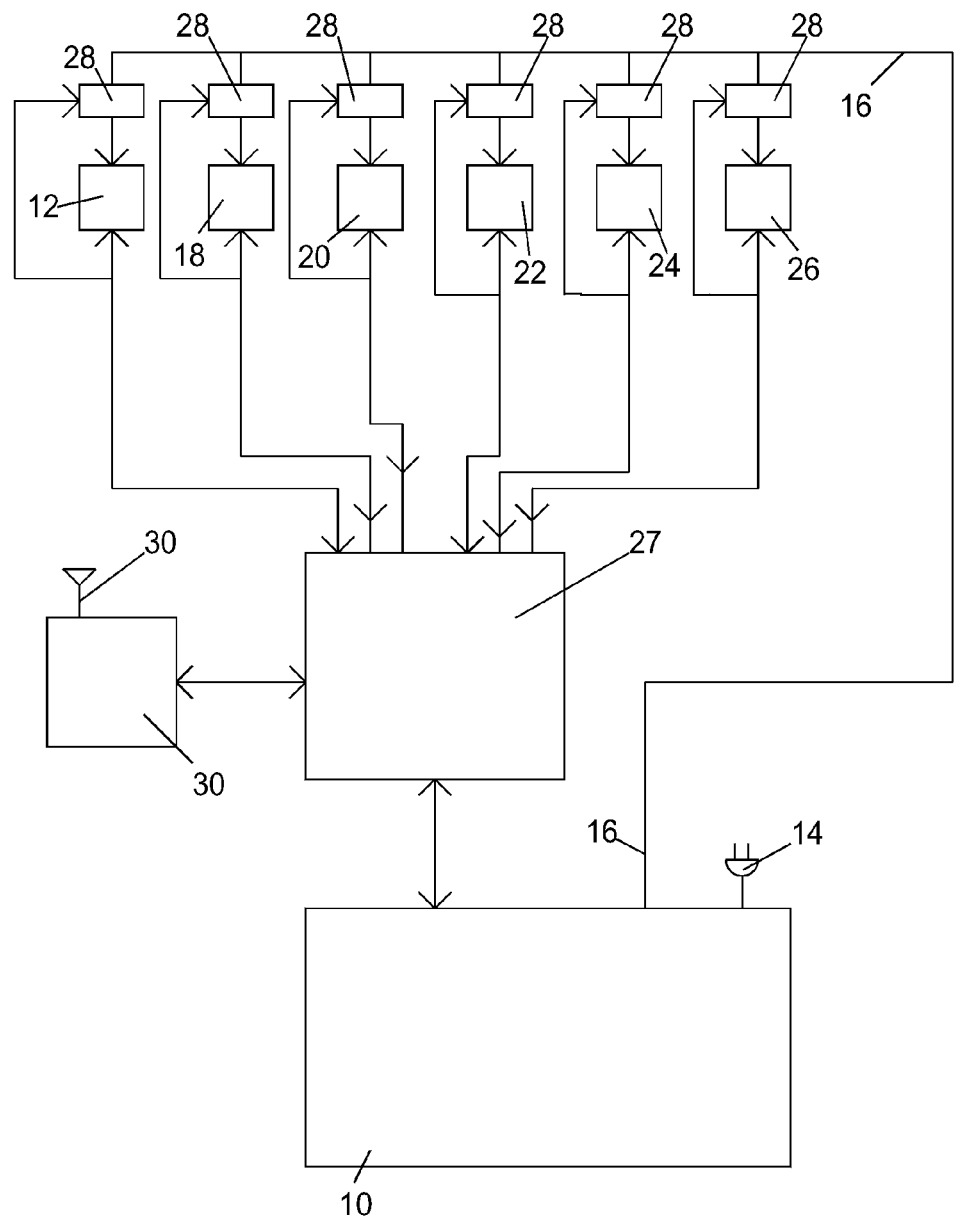
FIG. 1 is a block diagram illustrating an exemplary layout suitable for practice of a first example of the present invention.

A battery pack 10 is provided, in this example, in a electric vehicle where it is employed as a primary function to provide motive energy to a traction system 12 which rotates wheels under driver control. The battery pack 10 could also be provided in any other system, as a non limited example, as a backup power source for data processing systems and as a backup power source for domestic electricity supplies such as where local non-grid generation is also employed. A charging port arrangement 14 allows the battery pack 10 to be charged, as will be described later, in whole or in part. The charging port arrangement can use any power source to charge the battery pack 10. The possible power sources include, but are not limited to: mains (grid) supplied AC electrical power; an independent electrical generator; and a wirelessly coupled field operable to provide electrical energy.

The battery pack 12 provides a power main 16 to individual power consuming items. The main item is, as described above, a traction system 12 that moves the electric vehicle. Accessories include but are not limited to; interior heaters 18; interior and exterior lights 20; radio and entertainment devices 22; satellite navigation devices 24; and any other devices 26 e.g. accessory sockets, screen washers, screen wipers and demisters.

A controller 27 in the form of a processor is coupled to all connectable items 12, 18-26 to receive data and to control connection thereof via a control element 28. Data received can be the type and identity of each element 12, 18-26, and current received by the element 12, 18-26. This information is employable by the processor 27 to call up and use software packages appropriate to each particular connectable element 12 18-26 for use, as an example, in performance analysis. The control element 28 also allows individual connectable elements 12 18-26 to be either connected or disconnected from the power main 16 in response to instructions provided by the processor 27.

The processor 27 is coupled to provide display information to and to receive control instructions from a driver interface 30 provided as a dashboard display instrument. The driver interface 30 displays, for example, the state of charge or states of charge of the battery pack 10, and details of expected availability through time of individual connectable elements 18-26. The driver interface 30 also allows the driver to select different individual connectable elements 18-26 to be switched on or off and adjusted in intensity by means of, for example, touch switches and touch slider bars.

The combination of the processor 27 and the driver interface 30 are provided with a radio communication 32 by means of which program and data updates, uploads and downloads can be provided. This allows for remote analysis, data gathering, and electric vehicle upgrading from without. The radio communication 32 can also include a mobile telephone, Wi-Fi® (registered trademark) or Internet connection enabling the vehicle to be interrogated updated and controlled from an individual users computer or other portable device.

Figure 2A:
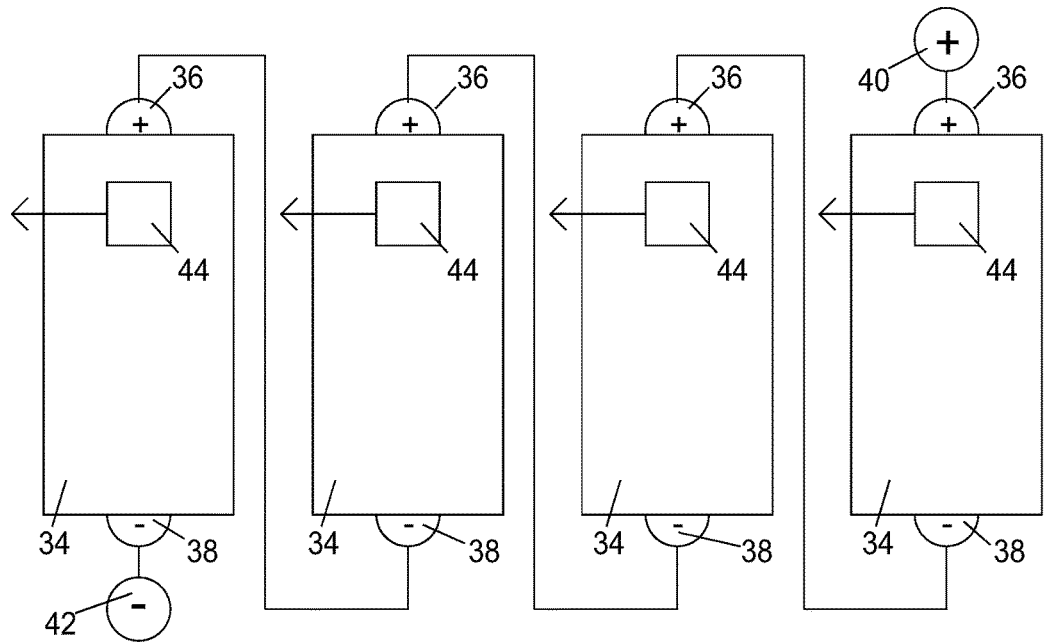
FIGS. 2A and 2B are exemplary block diagrams of the battery pack shown in FIG. 1 according to the first example of the invention.
Figure 2B:
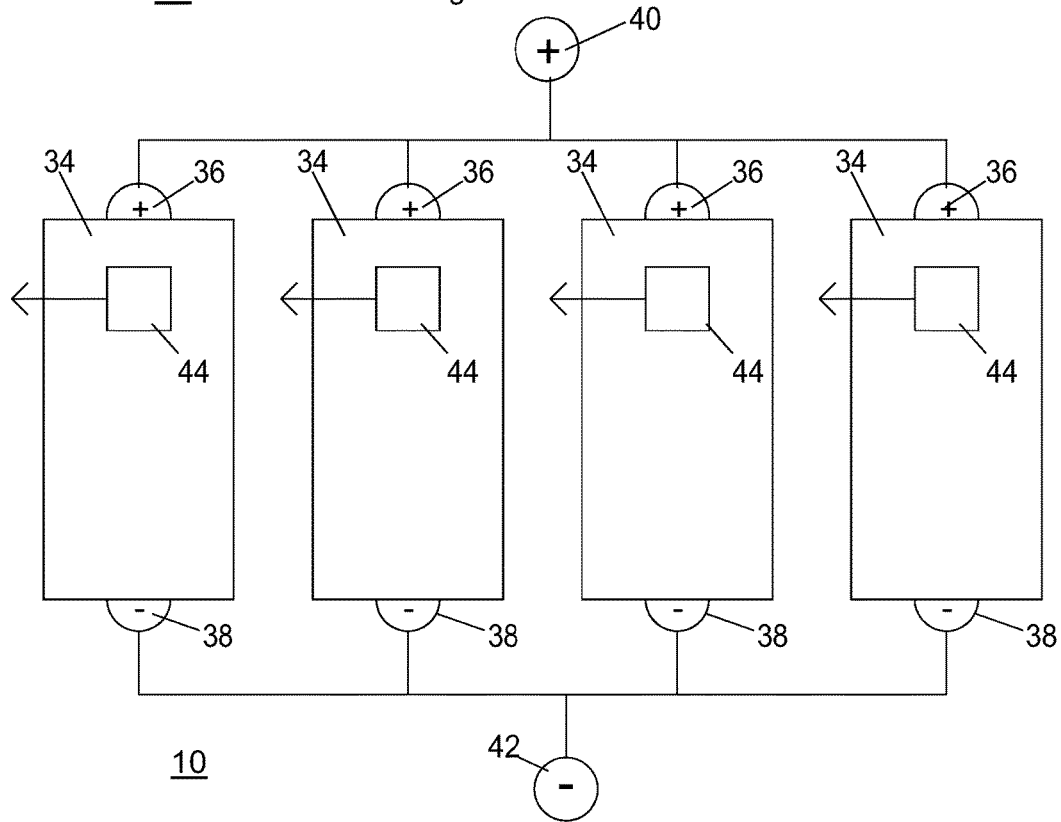

Attention is next drawn to FIGS. 2A and 2B, being exemplary block diagrams of the battery pack 10 shown in FIG. 1 employable in a first example of the invention.

In the first example of the invention, the battery pack 10 is charged and discharged as a whole. In FIG. 2A, individual batteries 34, each having a battery positive terminal 36 and a battery negative terminal 38, are connected in series to provide the sum of the potential differences of the individual batteries 34 between a battery pack positive terminal 40. In FIG. 2A the individual batteries 34 are connected in parallel, with each battery positive terminal 36 connected together with every other battery positive terminal to feed a battery pack positive terminal 40 and each battery negative terminal 38 connected together with every other battery negative terminal 38 to feed a common battery pack negative terminal 42.

Each of the batteries 34 in FIGS. 2A and 2B can comprise a single cell, or can comprise a plurality of serially connected cells. While in the FIG. 2B configuration the individual batteries must all present the same potential difference between their battery positive terminal 36 and their battery negative terminal 38, in the FIG. 2A configuration the individual batteries 34 can provide different potential differences between their battery positive terminals 36 and battery negative terminals 38. While in the FIG. 2A configuration the individual batteries 34 must all have the same charge capacity (i.e. Amp Hours for full charge and discharge), in the FIG. 2B configuration the individual batteries 34 can have different charging capacities from one another.

Each battery 34 comprises a battery monitor 44. Each battery monitor 44 provides digital data concerning the individual battery 34, to which it is attached or with which it is integrated, to the processor 27. The battery monitor 44 data allows the processor 27 to perform control functions in response to indications from each of the battery monitors 44. Each battery monitor 44 relays to the processor 27 data concerning the instant current being received by or provided by its associated individual battery 34. In addition, each battery monitor 44 can relay to the processor 27 at least one of: the terminal voltage of its associated individual battery 34; and the temperature of its associated battery 34.

While FIGS. 2A and 2B are here provided showing four individual batteries 34 each, it is to be appreciated that in each of FIGS. 2A and 2B the first example of the present invention can function with as few as one individual battery 34 and as many as an unlimited number of individual batteries 34.

Figure 3:
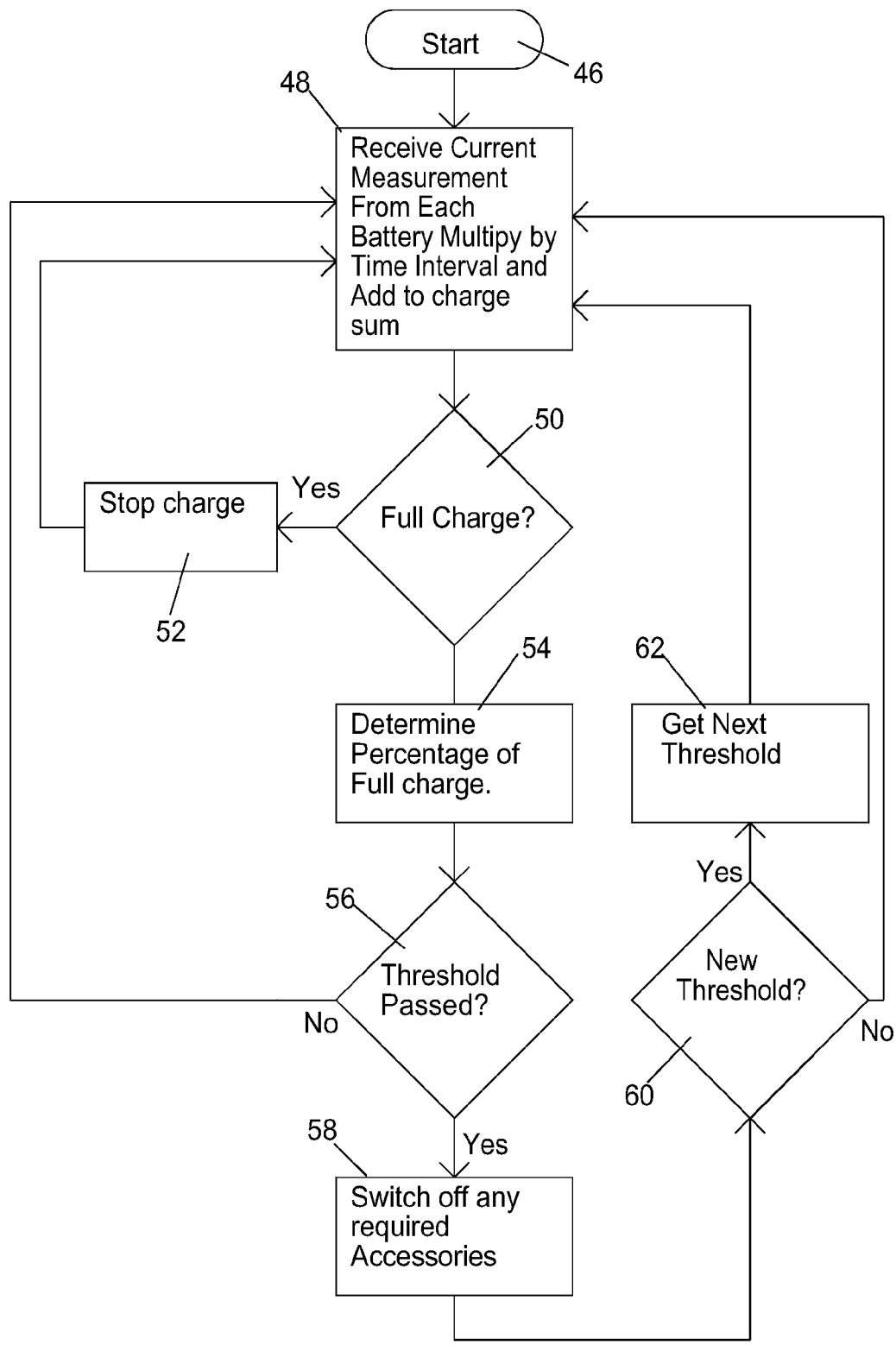
FIG. 3 is an exemplary flow chart illustrating one way in which the first embodiment of the invention can be practiced.

Attention is next drawn to FIG. 3, an exemplary flow chart illustrating one way in which the first embodiment of the invention can be practiced.

From a start 46 a first operation 48 accepts instant current readings from each battery monitor 44. The processor 27 comprises a clock employable, by counting clock pulses, to measure time. The first operation 48 accepts current flow measurements from each battery monitor 44 at regularly repetitive time internals at the end of recurring time interval. The first operation 48 then multiplies the instant current for each battery monitor 44 to determine the amount of charge (amp hours) either flowing to charge the associated individual battery 34 or flowing to discharge the associated individual battery 34. The first operation 48 then adds the charge or discharge amount to a running tally kept for each individual battery 34 to find a charge amount for that individual battery 34. In this example, a current flowing to charge an individual battery causes the running tally to be increased, and a current flowing to discharge an individual battery causes the running tally to be decremented. The running tally thereby gives a measurement of the amount of charge contained in each individual battery.

A first test 50 then checks to see if the battery pack 10 is fully charged. If it is, a second operation 52 stops any charging operation and passes control back to the first operation 48. In this manner, overcharging of the battery pack 10 is avoided. If the battery pack 10 is not fully charged, a third operation 54 determines the percentage of full charge held within the battery pack 10.

A second test 56 then checks to see if the percentage of total charge in the battery pack 10 has passed a predetermined threshold. If it has not, control passes to the first operation 48. If it has, a fourth operation 58 then switches off (if the battery pack 10 is being discharged) or on (if the battery pack 10 is being charged) the ability of specified accessories to be activated as described here after.

It is an option to provide the first test 50 before rather than after the third operation 54.

A third test 60 then checks to see if, as a consequence of passing the threshold of the second test 56, the predetermined threshold should be changed. If the threshold(s) does not require changing, control is passed to the first operation 48. If the threshold(s) does require changing, a fifth operation 62 fetches the next predetermined threshold, which one being determined by whether the battery pack 10 is being charged or discharged, for the second test 56 to employ. Alternatively, the user may be asked to select a new threshold through the driver interface 30. Control is then passed to the first operation 48.

An example is now given of how the first embodiment of the invention can operate under the control of the method illustrated in FIG. 3 for the serial battery connection of FIG. 2A or the parallel battery connection of FIG. 2B. In this explanation the total possible battery pack charge capacity is 100%.

Discharge of the battery pack is achieved, under the control of the processor 27, using designated charge allocations. A charge allocation comprises a percentage allocation to the traction system, and individual allocations to each of the accessories 18, 22-26. The allotted charge allocation represents the threshold to be passed in the second test 56. As the state of charge or discharge of the battery pack 10 triggers the second test 36, the fourth operation 58 enables or disables use of designated accessories 22-28 which have no longer have, or commence to have, a change amount allocation. There can be plural sets of charge allocations, depending upon the state of charge or discharge of the battery pack 10, and the third test 60 and fifth operation 62 (or the user) change the allocated charge amounts as required. The allocated charge amounts can be selected by the user through use of the driver interface 30, or can be stored in and automatically retrievable from the processor 17. Stored allocations can be downloaded by use of the radio communication 32 facilities as described As an example, when the battery pack 10 is 100% charged (100 units), the user or processor 27 can allocate 75% of the battery pack charge capacity to power the engine 12 (75 units), 15% of the battery pack 10 charge capacity for lights 20 (15 units) and remaining 10% of the battery pack 10 charge capacity for heating 18 and the radio 22 (10 units).

As a continuation of the example, after a period of vehicle use, the battery pack 10 may be 25% discharged. In this example, the running tally has new readings of 56 units for the engine 12 (75% of 75% charged battery), 11 units for lights 20 (15% of 75% charged battery) and 7.5 units for heating and radio 18 22 (10% of 75% charged battery).

At this point, using the processor 27, or the user via the user interface 30, changes the charge allocations to 90% of the battery to power the engine 12, 10% of the battery to power the lights 20 and 0% of the battery for heating 18 and radio 22. The new readings will be 67 units for the engine power 12 (90% of 75% charged battery), 7.5 units for lights 20 (10% of 75% charged battery) and 0 units for heating 18 and radio 22. These are the new thresholds set by the third test 60 and fifth operation 62 to be used by the second rest 56.

Still within this example, after a further period of use, there may remain 50% of total charge capacity remaining within the of the battery pack 10. The new running tally readings can then be 45 units for the engine power 12, 5 units for lights 20 and 0 units for heating and radio 18 22.

Using the this battery pack 10 charge state as starting point for charging the battery pack 10 as a whole, the battery pack 10 being only 50% charged, only 50% total capacity of the battery pack 10 can be charged. The user can decide or the processor 27 can automatically elect that allocations for lights 10, heating and radio 18 22, should be reduced to zero and a charge allocation for engine 12 alone should be made i.e. 90% charging of 50% of the battery. Should the battery pack 10 charge be reduced to zero to a predetermine state of charge near to zero, all operation, including providing power to the motor drive system 12, can be disabled until the battery pack 10 has more charge. This avoids having a battery totally flat.

If, thereafter, the battery is charged to 95% in total i.e. 50% (existing charge)+90% of 50% discharged battery capacity=95% charged battery. New allocations are automatically set as the battery pack 10 charge is increased. Alternatively, reviewed allocations can be provided by the user using the driver interface 30.

The first example of the present invention provides a time and cost advantage over earlier systems and methods. For example, if it takes 10 hours to charge 50% of the battery, by isolated charging of selected or required allocations, the user can spend only 9 hours to charge the battery and can save 1 hour charging time. Shorter charging time avoids unnecessary expenditure and conserves resources.

Figure 4:
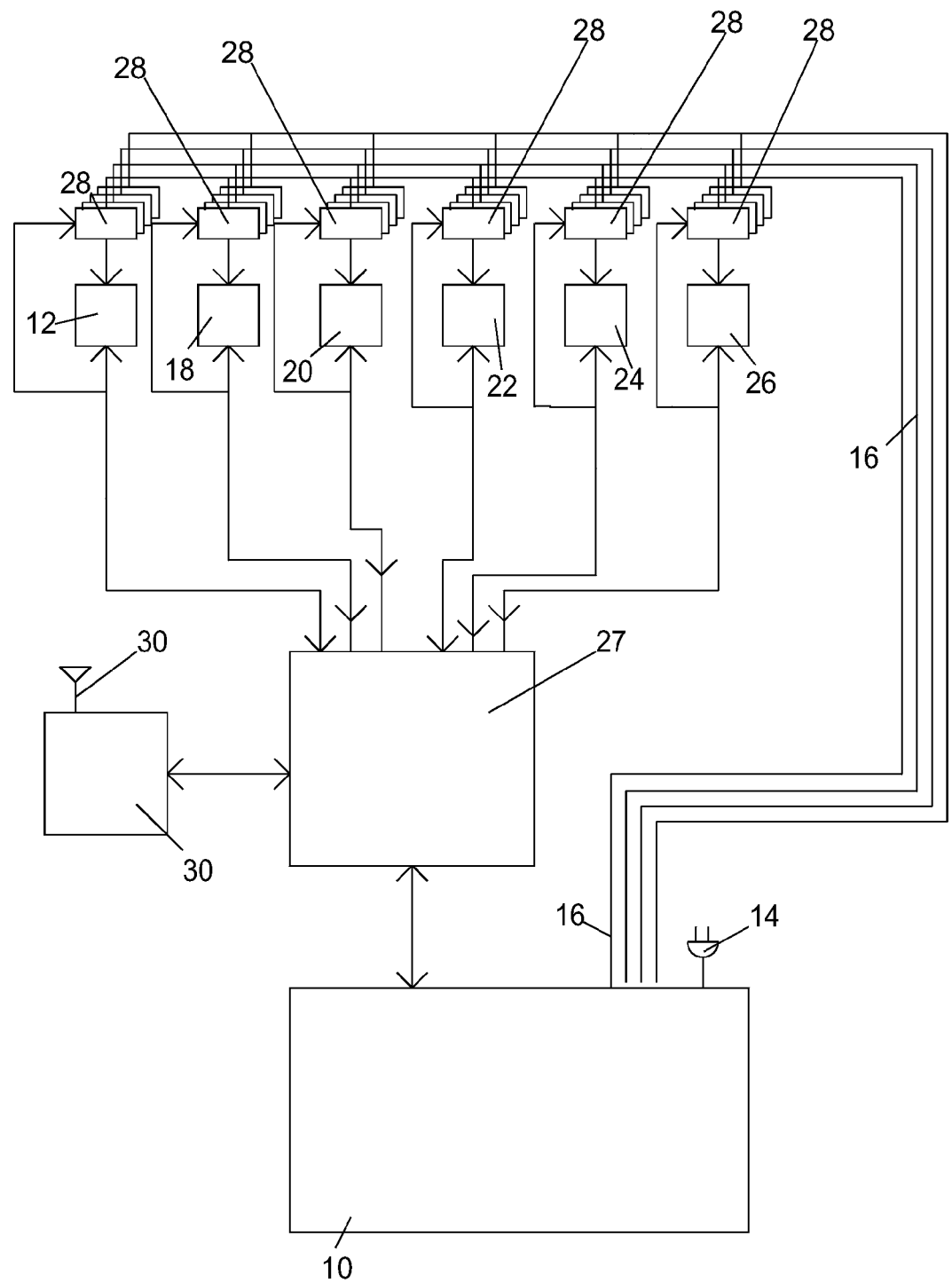
FIG. 4 is a block diagram illustrating an exemplary layout suitable for practice of a second example of the present invention.

Attention is next drawn to FIG. 4, a block diagram illustrating an exemplary layout suitable for practice of a second example of the present invention.

FIG. 4 is an expansion upon and an elaboration of FIG. 1. In FIG. 4, like numbers have like meanings and designate like items with functions as are designated in FIG. 1, and no further explanation is given.

In FIG. 4, the power line 16 provides a plurality of individual lines and the control element 28 of FIG. 1 becomes a plurality of stacked control elements, each individually switchable by the processor 27, and each associated with a particular power consumption element 12 18-26.

In operation of the second example of the present invention, power consuming element 12 18-26 can be connected to the battery pack 10 by a stacked control element 28 either through a selectable one of the plural of power main 16 lines. If more current capacity is required, more than one connection can be made to the same power consuming item 12 18-26 by more than one stacked control element 28.

Figure 5:
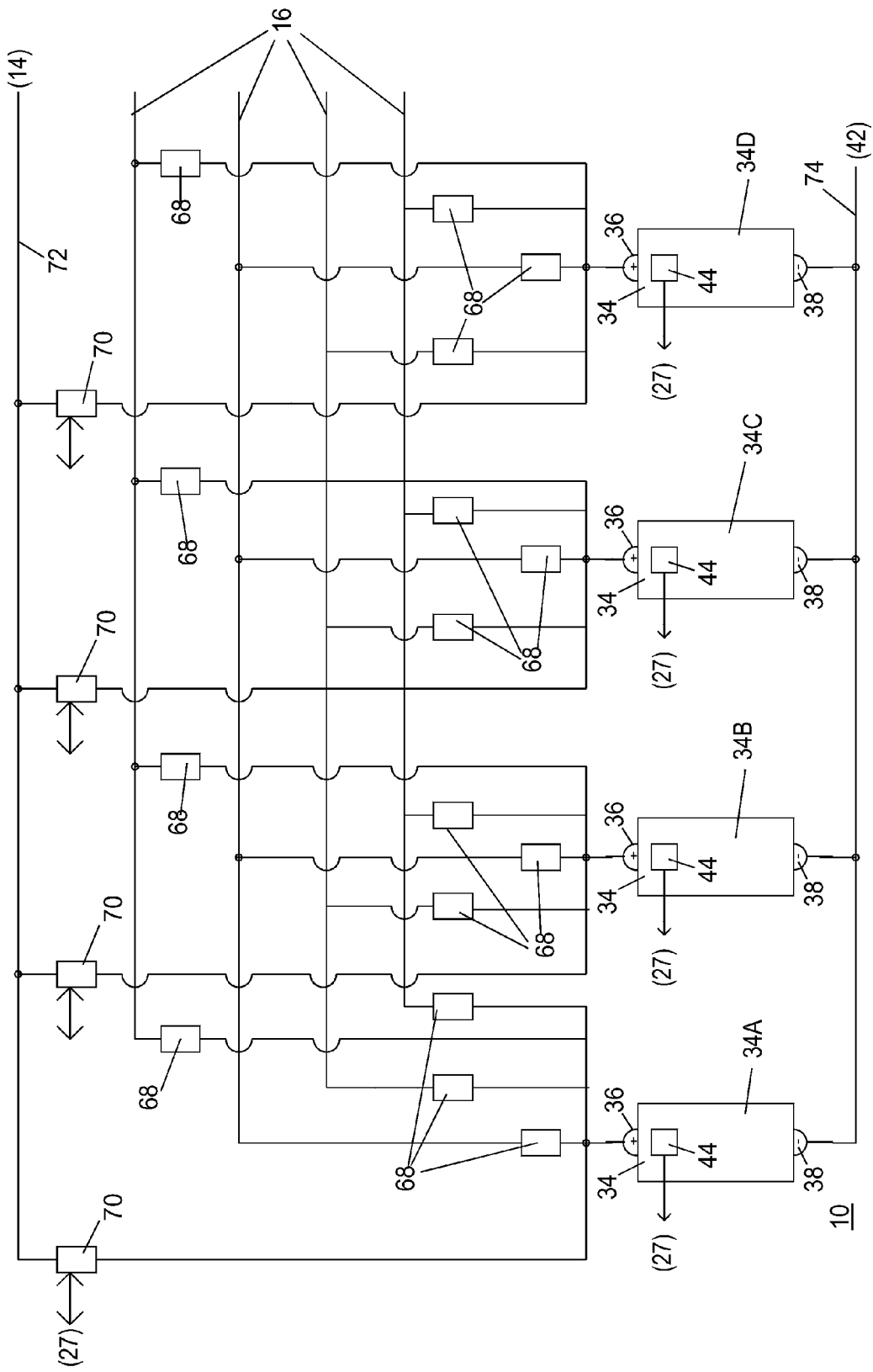
FIG. 5 is an exemplary schematic diagram illustrating one way in which the battery pack of FIG. 4 can be organized to support the second example of the invention.

Attention is next drawn to FIG. 5, an exemplary schematic diagram illustrating one way in which the battery pack 10 of FIG. 4 can be organized to support the second example of the invention.

The battery pack 10 of FIG. 5 contains elements in common with elements found in FIGS. 2A and 2B. Individual batteries 34 and battery monitors 44 are such common elements, and the same description applies as was given with reference to FIGS. 2A and 2B and the same additional features, caveats and exceptions also apply.

In FIG. 5, control from the processor 27 (connection not shown, but understood) can instruct battery pack 10 control elements 68 to connect, or not to connect, any single individual battery 34 or any combination of individual batteries 34 together to the power line 16 plural outlet lines. Control from the processor 27 can also instruct none, or any one or more individual battery charge selection switches 70 to connect their associated battery 34 to a charging line 72 that derives its current from the charging port 14 of FIG. 4.

The arrangement of FIG. 5 allows none, one or any combination of individual batteries 34 to be switched to supply the power main 16. The arrangement of FIG. 5 also allows no battery to be switched to receive charge, or one, or any combination of individual batteries 34 together to be switched by their associated charge selection switches 70 to receive charge from the charging line 72.

The arrangement of FIG. 5 thus allows the user, through the driver interface 30, or by the processor 27 acting in an automatic manner, to select provision of individual batteries 34 in any combination for any service 12 18-22.

While FIG. 5 shows four individual batteries 34, it is to be understood that the second example of the invention allows for use of as few as two and as many as an unlimited number of individual batteries 34. It is also to understood that while FIG. 5 shows individual batteries 34 being coupled in parallel between lines 16 72 and a common ground 74 constituting the battery pack enactive terminal 42 of FIGS. 2A and 2B, the invention also covers the use of serial connection to provide combination of individual batteries 34 and use of individual ground lines. Those, skilled in the art, will know variations upon the arrangement of FIG. 5 whereby such serial connection of individual batteries to achieve combinations of individual batteries 34 can be provided.

For the purpose of the following description, in FIG. 5, the individual batteries 34 are given distinguishing identifications 37A for a first battery, 37B for a second battery, 37C for a third battery and 37D for a fourth battery.

FIG. 5 shows a so-called distributed battery 34 configuration where batteries 34 can be used in any selectable connection.

Figure 6:
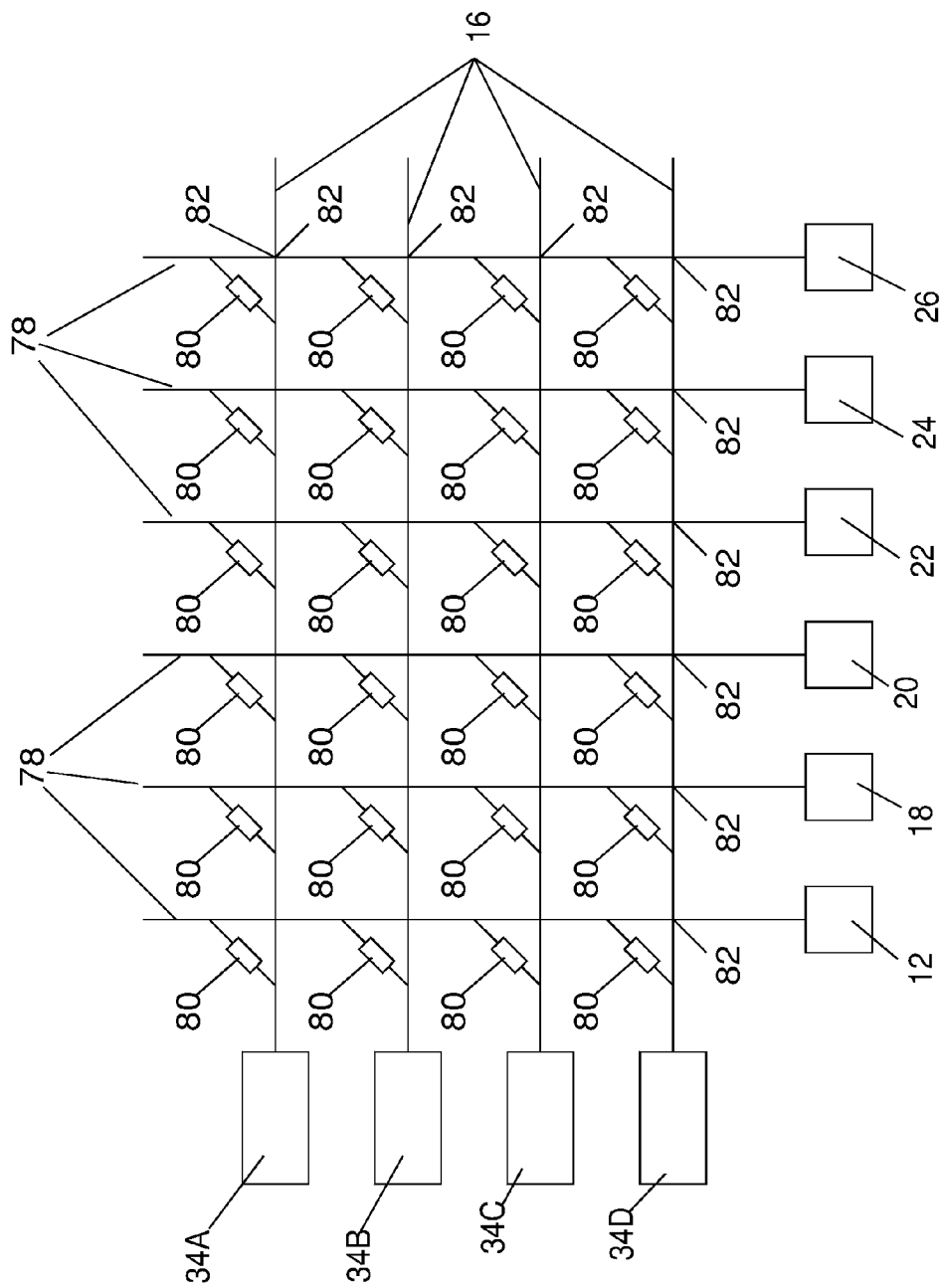
FIG. 6 is a more conceptualised, visualisable and complete representation of a network distributed battery system useable in the second example of the present invention and shown in FIGS. 4 and 5.

Attention is next drawn to FIG. 6, a more conceptualised, visualisable and complete representation of a network distributed battery system useable in the second example of the present invention. In the conceptualised representation, a single horizontal (as shown) crosswire 76 is coupled to each individual battery 34A 34B 34C 34D and a single vertical (as shown) crosswire 78 is coupled to each connectable appliance 12 18-26. A bridging connection 80 is provided at each crosswire 76 78 intersection 82 (only a representative number of which are pointed out in FIG. 6) corresponding in processor on/off switching control with, for example, the battery pack 10 control elements 68 and the charge selection switch 70. The charging line 72 is not included in FIG. 6, but it is to considered an important part of the crossbar system of FIG. 6 and can be the charging line 72 can be included as a further vertical crosswire 78.

An explanatory and exemplary description is now provide for the operation of the second example of the invention.

In this example, the maximum charge capacity for each battery 34A 34B 34C 34D is equated to 100% of each battery's maximum charge capacity. Thus, at full charge:

first battery 34A charge=100%=100 units
second battery 34B charge=100%=100 units
third battery 34C charge=100%=100 units
fourth battery 34D charge=100%=100 units The sum total charge of 400 units then represents 100% of battery pack charge capacity.

When discharging the battery pack 10 the individual batteries 34A 34B 34C 34D are used and organized rather than the entire battery pack 10.

In the explanation of the second example of the invention, a "segment" is defined as one or more individual batteries 34A 34B 34C 34D grouped and connected together to provide a source of power provision.

In this example of use, the user, by using the user interface 30 can create a first single "segment" (Segment 1) to power the engine by pairing the first individual battery 34A with the second individual battery 34B, to be connected together to power the traction system 12. The user can also create a second "segment" (Segment 2) to power the lights 20 from the third individual battery 34C. The user can also create a third "segment" (Segment 3) to power the heating (exclude radio for this example). The result of this segmentation will result in 50% of the battery being segmented for the engine, 25% for the lights and remaining 25% for heating.

After a period of use of the vehicle there can be, for the purposes of this example, a 25% discharge in Segment 1 i.e. 75 units remaining in the first individual battery 34A and 75 units remaining in the second individual battery 34B. This translates to 37.5% of the battery pack 10 as a whole i.e. (75+75)/400. For the purposes of this example, the user did not use the lights and heating therefore Segments 2 & 3 remain at 100%.

In this example, at this point, the user decides to increase the battery capacity for the traction system, and changes the Segment 1 to be a combination of the first individual battery 34A, the second individual battery 34B, and the third individual battery 34C, which results in Segment 1 being 87% charged and translates to 43% of the battery pack 10 total possible charge. If the third individual battery 34C and the fourth individual battery 34D were are combined, it would result in Segment 1 being charged to 100%, which translates to 50% of the battery pack 10 total charge capacity.

Other combinations are also possible such as first individual battery 34A+second individual battery 34B+third individual battery 34C=83% of charged capacity in Segment 1, translating to 62.5% of the battery pack 10 possible charge. Third Individual battery 34C+fourth individual battery 34D+first 34A or second 34B individual battery=91% charged Segment 1, translating to 68.75% of the battery pack 10 charge As an example of charging the battery pack 10 according to the second example of the invention, if, for the sake of this example, Segment 1 is a combination for the third individual battery 34C (100 units) and the fourth individual battery 34D (100 units) and the first individual battery 34A (75 units), and Segment 2 is the second individual battery 34B (75 units) and heating is disabled. This translates to 87.5% of the battery pack 10 charge.

If, for the sake of this example, the user decides to charge Segment 1 only and to disable charging to Segment 2, at the end of the charging exercise, the battery pack is charged to 93.75% of its total charge capacity.

The second example of the invention provides the technical improvement of permitting faster an more economical charging to be achieved. For example, if it takes 10 hours to charge 12.5% of the battery, by isolated charging of a selected or required Segment, the user spends, for example, only 5 hours to charge the battery and can save 5 hours of charging time. This also prevents unnecessary expenditure and waste of resources at a given point in time.

The invention also provides for use of a combination of the first example of the invention and the second example of the invention together. The distributed network of FIGS. 4 to 6 can be further extended to include allocated charging and discharging as described with respect to FIGS. 1 to 3. In this case, having established a connection layout for individual batteries to establish "segments", a charge allocation method, as described with reference to FIGS. 1 to 3, can then be used to determine changes of allocation limits and use of appliances 18-26.

As another possibility, segments can be assigned to different functions, such as traction alone and heating lighting and radio. As the heating lighting and radio segment discharges, a charge allocation routine can be applied. As the heating lighting and radio segment becomes totally discharged, the heating lighting and radio function can be included into the traction segment and a further allocation and device disconnecting routine applied as describes in relation to FIGS. 1 to 3.

The invention, as described above for the first and second examples, allows for progressive charging and discharging of a battery and battery pack.

Those skilled in the art will be aware of many variations and combinations which can be employed without departing from the invention as claimed.

The invention is more clearly defined by the appended Claims.

I claim:

1. An apparatus to control charge and discharge of a storage
  battery, the apparatus comprising:
    a battery pack;
      a plurality of stacked control elements to connect the battery pack to one or more of a plurality of power consuming items according to a charge allocation profile through one or more connectable elements, wherein the charge allocation profile is indicative of a share of battery capacity allocated to a power consuming item;
    a battery monitor coupled to the battery pack, to monitor the state of charge of the battery pack; and
  a processor, coupled to the battery monitor, to:
    compare the state of charge of the battery pack with the charge allocation profile;
    determine when the difference between the monitored state of charge and the profile passes a threshold amount;
    select one or more individual batteries to supply power as a segment;
    selectably connect the segment to one or more of a plurality of power consuming items according to a charge allocation profile;
    monitor a state of charge of the segment;
    compare the state of charge of the segment with the segment charge allocation profile, wherein the charge allocation profile is indicative of a share of battery capacity allocated to a power consuming item;

determine when a difference between the state of charge and the segment charge allocation profile passes a threshold amount; and adjust a state of connection of at least one of the plurality of power consuming items in response to the threshold being passed based on at least one of connecting and disconnecting the one or more connectable elements from the battery pack to the plurality of power consuming items.

2. The apparatus of claim 1 comprising a driver interface, coupled to the processor, to allow a user to select a new charge allocation profile in response to the threshold being passed.

3. The apparatus of claim 1 is further to:
receive the new charge allocation profile from a user; and
receive the new charge allocation profile from a controlling processor.

4. The apparatus of claim 1, wherein the driver interface is to allow the user to change the allocation profile at any time.

5. The apparatus of claim 1, wherein during battery pack discharging, a power consuming item is disconnected when a charge allocation profile entry of the power consuming item falls to zero; and, during battery pack charging, a power consuming item is reconnected whenever the battery pack charge allocated to the power consuming item rises above zero.

6. The apparatus of claim 1, used in an electrical vehicle.

7. An apparatus for controlling charge and discharge of a battery
pack, wherein the battery pack comprises:
a plurality of individual batteries, and
wherein the apparatus comprises:
a driver interface to allow selection of one or more individual batteries to supply
power as a segment to a power consuming item, where the apparatus is to establish one or
more segments, the driver interface programmed to;
select one or more individual batteries to supply power as a segment;
selectably connect the segment to one or more of a plurality of power consuming items according to a charge allocation profile;
monitor a state of charge of the segment;
compare the state of charge of the segment with the segment charge allocation profile, wherein the charge allocation profile is indicative of a share of battery capacity allocated to the power consuming item;
determine when the difference between the state of charge and the segment charge allocation profile passes a threshold amount; and
adjust a state of connection of at least one of the plurality of power consuming items in response to the segment threshold being passed based on at least one of connecting and disconnecting the one or more connectable elements from the battery pack to the plurality of power consuming items;
wherein no individual battery is selected to provide power in more than the segment, and the driver interface allows addition or removal of at least one individual battery from the segment.

8. The apparatus of claim 7, comprising a plurality of stacked control elements to connect each segment to supply power to a selectable range of one or more power consuming items.

9. The apparatus of claim 7, wherein the driver interface is to allow re-assigning individual batteries to within the one or more segments.

10. The apparatus of claim 7, wherein to control charge and discharge of the charge within a segment, the apparatus comprises:
a stacked control element to connect the segment to one or more of a plurality of power consuming items according to a charge allocation profile, wherein the charge allocation profile is indicative of a share of battery capacity allocated to one of a power consuming item;
a battery monitor, coupled to the battery pack, to monitor the state of charge of the segment;
a processor, coupled to the battery monitor, to:
compare the state of charge of the segment with the segment charge allocation profile;
determine when the difference between the monitored segment charge and the segment charge allocation profile has passed a threshold amount; and
adjust the state of connection of at least one of the plurality of power consuming items in response to the segment threshold being passed based on at least one of connecting and disconnecting the one or more connectable elements from the battery pack to the plurality of power consuming items.

11. The apparatus of claim 7, wherein the processor is to select a new segment charge allocation profile in response to the threshold being passed.

12. The apparatus of claim 11, further to:
receive the new charge segment allocation profile from a user; and
receive the new segment allocation profile from the processor.

13. The apparatus of claim 7, comprising a driver interface to allow changing the segment allocation profile at any time.

14. The apparatus of claim 7, wherein, during segment discharging, a power consuming item is disconnected when its segment charge allocation profile entry falls to zero; and, during segment charging, a power consuming item is reconnected whenever the segment charge allocated to that power consuming item rises above zero.

15. The apparatus of claim 7, used in an electrical vehicle.

16. A method for controlling charge and discharge of a storage battery, the method comprising:
selectably connecting a battery pack to one or more of a plurality of power consuming items according to a charge allocation profile, wherein the charge allocation profile is indicative of a share of battery capacity allocated to a power consuming item;
monitoring a state of charge of the battery pack;
comparing the state of charge of the battery pack with the charge allocation profile;
determining when the difference between the state of charge and the charge allocation profile passes a threshold amount; and
adjusting the state of connection of at least one of the plurality of power consuming items in response to the threshold being passed based on at least one of connecting and disconnecting the one or more connectable elements from the battery pack to the plurality of power consuming items.

17. The method of claim 16, further comprising selecting a new charge allocation profile in response to the threshold being passed.

18. The method of claim 17, further comprising at least one of: receiving the new charge allocation profile from a user; and
   receiving the new charge allocation profile from the processor.

19. The method of claim 16, further comprising changing the allocation profile at any time.

20. The method of claim 16, further comprising:
   disconnecting a power consuming item during battery pack discharging when charge allocation profile entry of the power consuming item falls to zero; and,
   during battery pack charging, reconnecting a power consuming item whenever the battery pack charge allocated to that power consuming item rises above zero.

21. The method of claim 16, for use in an electrical vehicle.

22. A method for controlling charge and discharge of a battery pack, where the battery pack comprises a plurality of individual batteries, the method comprising:
   selecting one or more individual batteries to supply power as a segment; establishing one or more segments, wherein no individual battery provides power in more than one segment;
   allowing, by the driver interface, at least one of addition and removal of at least one individual battery from the segment;
   selectably connecting the segment to one or more of a plurality of power consuming items according to a charge allocation profile;
   monitoring a state of charge of the segment;
   comparing the state of charge of the segment with the segment charge allocation profile, wherein the charge allocation profile is indicative of a share of battery capacity allocated to a power consuming item;
   determining when a difference between the state of charge and the segment charge allocation profile passes a threshold amount; and
   adjusting a state of connection of at least one of the plurality of power consuming items in response to the segment threshold being passed based on at least one of connecting and disconnecting the one or more connectable elements from the battery pack to the plurality of power consuming items.

23. The method of claim 22, further comprising connecting each segment to supply power to a selectable range of one or more power consuming items.

24. The method of claim 22, further comprising re-assigning individual batteries to within one or more segments.

25. The method of claim 22, further comprising selecting a new segment charge allocation profile in response to the threshold being passed.

26. The method of claim 25, comprising at least one of:
   receiving the new charge segment allocation profile from a user; and
   receiving the new segment charge allocation profile from a controlling processor.

27. The method of claim 22, further comprising changing the segment allocation profile at any time.

28. The method of claim 22, comprising:
   during segment discharging, disconnecting a power consuming item when a segment
charge allocation profile entry of the power consuming item falls to zero; and
   during segment charging, reconnecting a power consuming item whenever the segment
charge allocated to the power consuming item rises above zero.

29. The method of claim 22, for use in an electrical vehicle.

30. An apparatus according to claim 1, wherein the processor adjusts the state of connection to provide progressive charging and discharging of the battery pack.

31. An apparatus according to claim 7, wherein the processor adjusts the state of connection to provide progressive charging and discharging of the battery pack.

32. The method, according to claim 16, further comprising:
   progressively charging the battery pack; and
   progressively discharging the battery pack.

33. The method according to claim 22, further comprising:
   progressively charging the battery pack; and
   progressively discharging the battery pack.

34. The apparatus of claim 2, wherein a driver interface further displays a state of charge of a battery pack, and expected availability of a connectable element for connecting the battery pack to a power consuming item.

35. The apparatus of claim 1, wherein the processor further conducts a performance analysis of the battery pack based on data received from control elements coupled to plurality of power consuming items.

36. The apparatus of claim 35, wherein the processor conducts the performance analysis upon radio communication from a user.

37. The apparatus of claim 35, wherein the processor further selects a new charge allocation profile based on the performance analysis.

38. The apparatus of claim 1, wherein the power consuming item is at least one of a traction system, an interior heater, an interior light, an exterior light, a radio and entertainment device, an accessory socket, a screen washer, a screen wiper, a demister, and a satellite navigation device of an electrical vehicle.

39. The apparatus of claim 38, wherein the processor further determines location based services based on at least one of radio communication and satellite navigation.

40. The apparatus of claim 1, further comprising a radio communication to allow data gathering and remote analysis of data.

41. The apparatus of claim 40, wherein a user remotely adjusts the state of connection of at least one of the plurality of power consuming items based on the radio communication.

42. The apparatus of claim 40, wherein the radio communication further allows at least one of interrogation, update, and control of the apparatus.

43. The apparatus of claim 7, wherein the addition and removal of the at least one individual battery from the segment is further based on a performance analysis conducted by the processor, wherein the performance analysis is based on data received from control elements coupled to plurality of power consuming items.

44. The apparatus of claim 7, further comprising a cross wire coupling each individual battery of the battery pack on one end to the power consuming item on the other end.

45. The apparatus of claim 10, wherein the processor further:
   receives data from control elements coupled to the plurality of power consuming items, wherein the data is at least one of identity of the control elements and current received by the control elements; and modifies connection of the battery pack with the plurality of power consuming items based on at least one of connecting and disconnecting the control element with the power consuming item.

46. The method of claim 16, wherein adjusting the state of connection comprises receiving instructions from the processor to connect at least one of an individual battery from the battery pack and a combination of batteries to a power line.

47. The method of claim 16, wherein the comparing comprises: receiving current readings from at least one battery monitor;
calculating amount of charge for at least one of charging and discharging of an individual battery of the battery pack based on the current readings; and
determining the amount of charge exceeding a predetermine threshold, wherein the predetermined threshold is indicative of the charge allocation profile.

48. The method of claim 47, wherein the method further comprises computing a running tally corresponding to the battery pack based on the charging and discharging of individual batteries of the battery pack.

49. A method for modifying a capacity of a battery pack based on charge and discharge of the battery pack, wherein the battery pack is comprised of a plurality of individual batteries, the method comprising:
determining a battery capacity of a segment of the battery pack, wherein the segment comprises at least one individual battery from amongst the plurality of individual batteries, and the segment is to supply power to a power consuming item based on a charge allocation profile of the power consuming item;
altering the battery capacity of the segment based on at least one of a user input and determination by a processor;
selectably connecting the segment to one or more of a plurality of power consuming items according to a charge allocation profile;
monitoring a state of charge of the segment;
comparing the state of charge of the segment with the segment charge allocation profile, wherein the charge allocation profile is indicative of a share of battery capacity allocated to a power consuming item;
determining when a difference between the state of charge and the segment charge allocation profile passes a threshold amount; and
adjusting a state of connection of at least one of the plurality of power consuming items in response to the segment threshold being passed based on at least one of connecting and disconnecting the one or more connectable elements from the battery pack to the plurality of power consuming items.

50. The method of claim 49, wherein the altering the battery capacity based on determination by a processor comprises conducting a performance analysis based on data received from control elements coupled to plurality of power consuming items.

51. The method of claim 49, wherein the altering the battery capacity is performed based on at least one of adding and removing an individual battery from the segment, and wherein the adding and removing is based on connecting and disconnecting connectable items from batteries within the segment of the battery pack.

52. The method of claim 49, wherein altering the battery capacity of the segment is based on radio communication from a user.

53. The method of claim 49, wherein the altering the battery capacity of the segment is based on performance analysis of the battery pack and corresponding segments.

54. The apparatus of claim 5, wherein the battery pack charging is through one of mains (grid) supplied AC electrical power, an independent electrical generator, and a wirelessly coupled field operable to provide electrical energy.

55. The apparatus of claim 14, wherein the segment charging is through one of mains (grid) supplied AC electrical power, an independent electrical generator, and a wirelessly coupled field operable to provide electrical energy.

56. The method of claim 20, wherein the battery pack charging comprises providing electrical energy through one of mains (grid) supplied AC electrical power, an independent electrical generator, and a wirelessly coupled field.

57. The method of claim 28, wherein the segment charging comprises providing electrical energy through one of mains (grid) supplied AC electrical power, an independent electrical generator, and a wirelessly coupled field.

58. The apparatus of claim 30, wherein the progressive charging is through one of mains (grid) supplied AC electrical power, an independent electrical generator, and a wirelessly coupled field operable to provide electrical energy.

59. The apparatus of claim 31, wherein the progressive charging is through one of mains (grid) supplied AC electrical power, an independent electrical generator, and a wirelessly coupled field operable to provide electrical energy.

60. The method of claim 32, wherein the progressively charging comprises providing electrical energy through one of mains (grid) supplied AC electrical power, an independent electrical generator, and a wirelessly coupled field.

61. The method of claim 33, wherein the progressively charging comprises providing electrical energy through one of mains (grid) supplied AC electrical power, an independent electrical generator, and a wirelessly coupled field.

* * * * *